(12) United States Patent
Jackson et al.

(10) Patent No.: US 11,691,488 B2
(45) Date of Patent: Jul. 4, 2023

(54) DOOR HATCH ASSEMBLY

(71) Applicant: Roam Safe Pty Ltd, Wongawallan (AU)

(72) Inventors: Kerry Jackson, Wongawallan (AU); Mark Besant, Wongawallan (AU)

(73) Assignee: Roam Safe Pty Ltd, Wongawallan (AU)

( * ) Notice: Subject to any disclaimer, the term of this patent is extended or adjusted under 35 U.S.C. 154(b) by 921 days.

(21) Appl. No.: 16/558,888

(22) Filed: Sep. 3, 2019

(65) Prior Publication Data
US 2020/0070635 A1 Mar. 5, 2020

(30) Foreign Application Priority Data

Sep. 4, 2018 (AU) .............................. 2018101286
Sep. 4, 2018 (AU) .............................. 2018903265

(51) Int. Cl.
| | |
|---|---|
| *B60J 5/04* | (2006.01) |
| *E06B 9/52* | (2006.01) |
| *B60J 9/00* | (2006.01) |
| *E05C 7/02* | (2006.01) |
| *E05C 7/04* | (2006.01) |
| *E06B 7/32* | (2006.01) |

(52) U.S. Cl.
CPC .............. *B60J 9/00* (2013.01); *B60J 5/0468* (2013.01); *E05C 7/02* (2013.01); *E05C 7/04* (2013.01); *E06B 7/32* (2013.01); *E06B 9/52* (2013.01)

(58) Field of Classification Search
CPC ... B60J 9/00; B60J 5/0468; B60J 5/049; B60J 1/2011; E05C 7/02; E05C 7/04; E06B 9/52; E06B 7/32; E06B 7/30
USPC ....................................................... 49/171, 41
See application file for complete search history.

(56) References Cited

U.S. PATENT DOCUMENTS

| | | | | |
|---|---|---|---|---|
| 223,552 | A * | 1/1880 | Stroud et al. ............. | E06B 7/30 49/171 |
| 593,160 | A * | 11/1897 | Jones ........................ | E06B 7/28 49/70 |
| 775,798 | A * | 11/1904 | Chase ..................... | E06B 1/006 49/63 |
| 823,350 | A * | 6/1906 | Morrill ................... | E06B 1/006 49/171 |
| 1,340,673 | A * | 5/1920 | Roe ...................... | B60H 1/3407 454/273 |
| 1,657,506 | A * | 1/1928 | Jacobson ............... | B60J 1/2011 160/180 |
| 1,704,157 | A * | 3/1929 | Webber ................. | B60J 1/2011 160/90 |
| 1,749,055 | A * | 3/1930 | Ackerman ............... | E06B 7/30 49/171 |
| 2,028,108 | A * | 1/1936 | Sklar ........................ | E06B 7/30 292/189 |
| 2,503,019 | A * | 4/1950 | Zinner ..................... | E06B 7/10 454/211 |

(Continued)

*Primary Examiner* — Brent W Herring
(74) *Attorney, Agent, or Firm* — Cesari & McKenna, LLP (57) ABSTRACT

There is provided a door hatch assembly for an aperture in a screen door, the assembly including a substantially round rim mountable on a periphery of the aperture; a static member mounted in the rim and configured to cover at least a first portion of the aperture; and a hatch engaged with the static member and movable over the static member to reversibly cover at least a second portion of the aperture.

8 Claims, 10 Drawing Sheets

(56) References Cited

U.S. PATENT DOCUMENTS

| | | | | |
|---|---|---|---|---|
| 4,053,007 | A | * | 10/1977 | Griffith ............... E06B 7/32 160/354 |
| 4,094,099 | A | * | 6/1978 | Birch .................. E05D 3/04 160/96 |
| 8,794,683 | B2 | * | 8/2014 | Wysong ............... E05B 1/0046 292/336.3 |
| 2018/0100349 | A1 | * | 4/2018 | Anderson ........... E05D 15/165 |
| 2019/0128030 | A1 | * | 5/2019 | Bacon ................ E05C 7/02 |
| 2019/0193911 | A1 | * | 6/2019 | Reiley ............... B65B 31/00 |
| 2021/0244214 | A1 | * | 8/2021 | Springer ............ B65D 47/0885 |

* cited by examiner

DOOR HATCH ASSEMBLY

CROSS-REFERENCE TO RELATED APPLICATIONS

The present application claims the priority of Australian Application No. 2018903265 filed on Sep. 4, 2018, and Australian Application No. 2018101286 filed on Sep. 4, 2018. The content of these prior applications are hereby incorporated by reference in their entirety.

FIELD

Recreational Vehicle (RV) motor homes and camping trailers typically have an entrance with a primary door and a screen door which can be opened together or independently of one another. The main door provides security and safety for occupants, while the lightweight screen door provides airflow and restricts insects from entering the RV or trailer. Both doors are pivotally hinged for movement between open and closed positions relative to the entrance opening of the RV or trailer. The screen door can be attached to the main door so that the doors move together, or alternatively, can be detached from the main door so that the main door can be held open while the screen door is held closed.

In this conventional dual door assembly, the main door has an exterior handle for opening the door from outside the RV and an interior handle for opening the door from inside the RV. The screen door typically has a separate handle on the outside of the screen door for releasing the screen door latch.

The present invention provides options for access to the handles of these doors.

SUMMARY

According to one aspect of the invention, there is provided a door hatch assembly for an aperture in a screen door, the assembly including a substantially round rim mountable on a periphery of the aperture, a static member mounted in the rim and configured to cover at least a first portion of the aperture, and a hatch engaged with the static member and movable over the static member to reversibly cover at least a second portion of the aperture.

The door hatch assembly may further include a rim cover mountable on the rim from an inner face of the door.

The door hatch assembly may further include means to move the hatch over the static member. The means may be any practicable means, such as a knob, protrusion, or bolt attached to the hatch.

The door may be any screen door. Appropriately, the door is a screen door on a recreational vehicle, caravan or the like. A door hatch assembly of the invention may be included in a door at manufacture, or may be retro-fitted to an existing door.

The rim and static member may be manufactured as a unitary part, or they may be provided as separate parts, for pre-assembly, or assembly in parts onto the door.

The rim, static member and hatch may be manufactured as a unitary part, or they may be provided as separate parts, for pre-assembly, or assembly in parts onto the door.

The static member may be mounted in the rim by any practicable means. The static member and rim may be manufactured as a unitary part.

The static member and hatch may each be substantially semi-circular. The hatch may be engaged with the static member in any practicable manner that enables movement of the hatch over the static member, preferably in a sliding motion. In one embodiment of the invention, the hatch is engaged with the static member by means of a screw passing through the midline of the diameter line of each of a semi-circular hatch and static member such that the hatch pivots around the screw to reversibly cover the second portion of the aperture in the screen door.

The means to move the hatch may be any practicable means, either protruding from the hatch or indented into the hatch. In one embodiment of the invention, the means to move the hatch is a plunger pin attached to an end portion of the diameter line of the hatch.

The rim, static member, hatch, rim cover, and means to move the hatch, may be manufactured from the same or different material. The material of manufacture may include plastic, aluminium, or any other practicable material.

According to another aspect of the invention, there is provided a screen door including a door hatch assembly for an aperture in the screen door, the assembly including a substantially round rim mountable on a periphery of the aperture, a static member mounted in the rim and configured to cover at least a first portion of the aperture, and a hatch engaged with the static member and movable over the static member to reversibly cover at least a second portion of the aperture.

DETAILED DESCRIPTION

Figure 1:
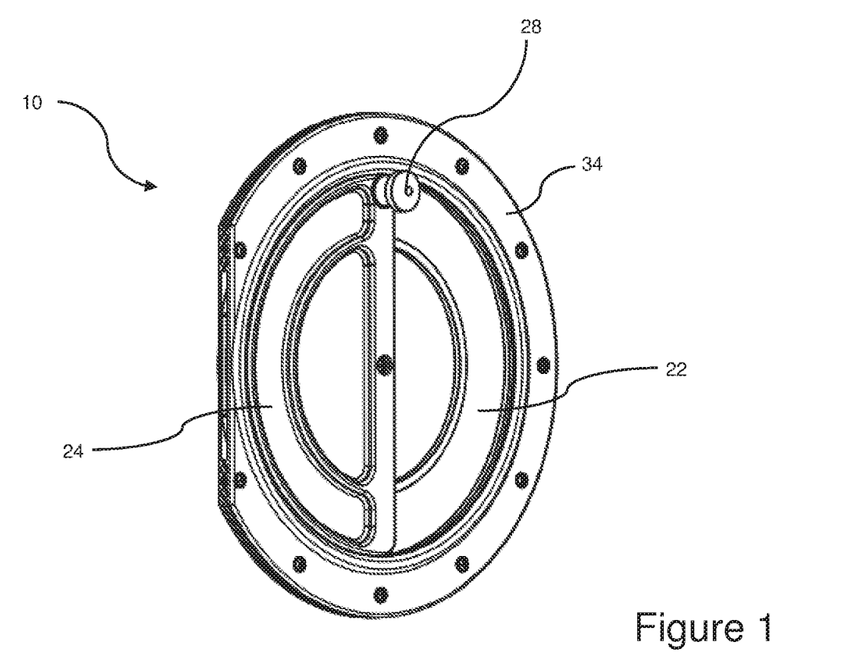
FIG. 1 is a rear face view of a hatch assembly of the invention, in a closed position.
Figure 2:
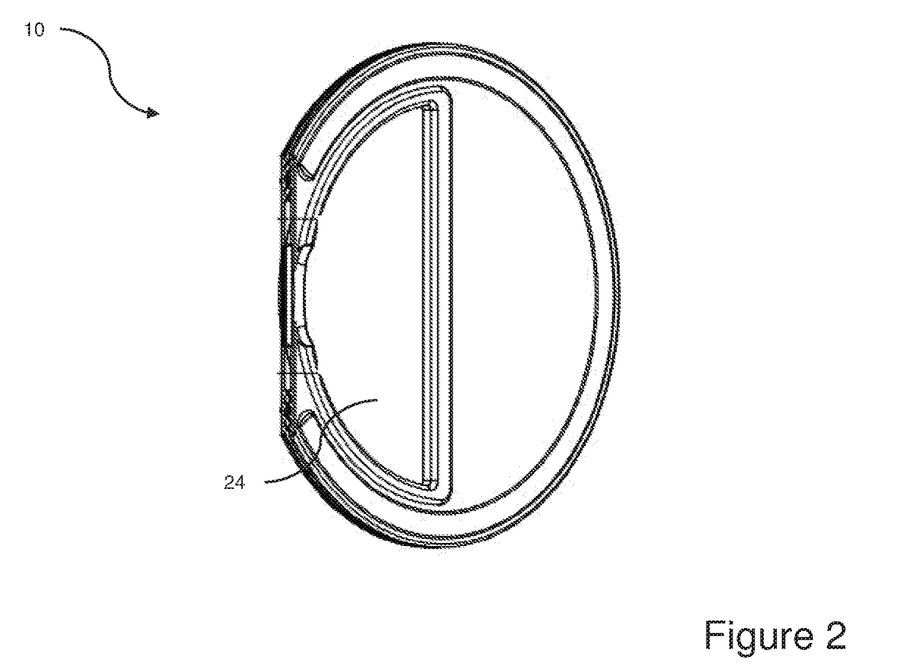
FIG. 2 is a front face view of the hatch assembly of FIG. 1, in a closed position.
Figure 3:
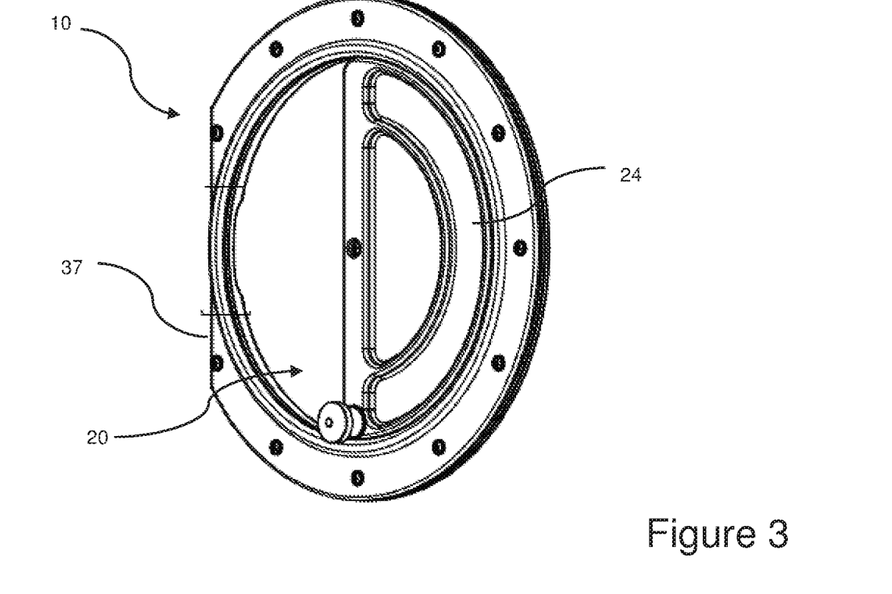
FIG. 3 is a rear face view of a hatch assembly of the invention, in an open position.
Figure 4:
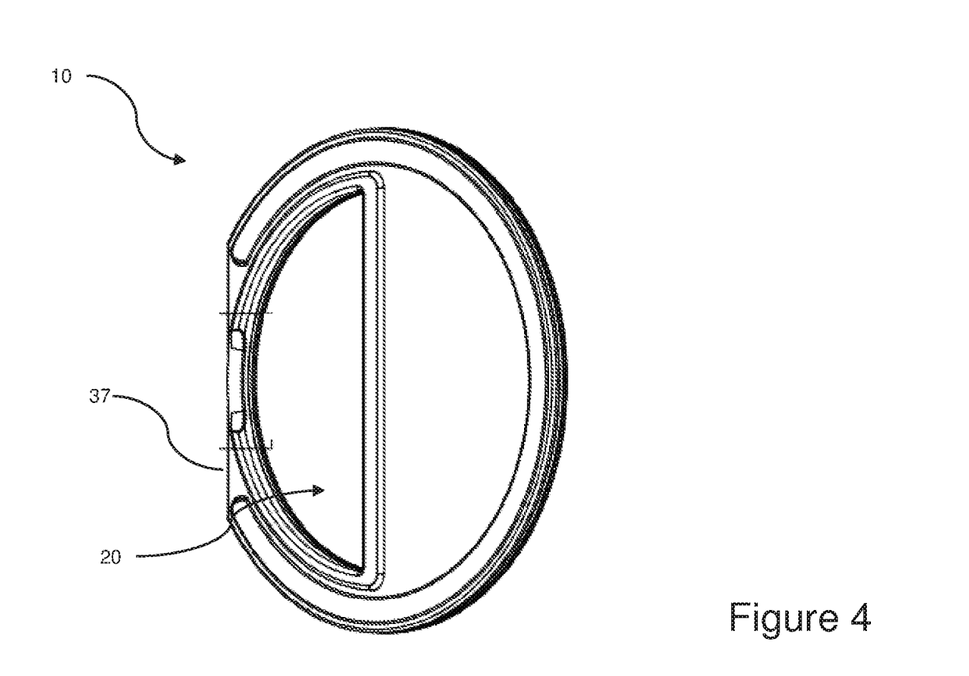
FIG. 4 is a front face view of the hatch assembly of FIG. 1, in an open position.

In FIGS. 1, 2, 3, and 4 there is shown an embodiment of the door hatch assembly 10 of the invention. FIGS. 1 and 3 show the door hatch assembly 10 from a rear side view. This is the side of the door hatch assembly that, in use, faces the interior of a vehicle to which the door including the door hatch may be attached. FIGS. 2 and 4 show the door hatch assembly 10 from a front side view. This is the side of the door hatch assembly that, in use, faces the exterior of a vehicle to which the door including the door hatch assembly 10 may be attached.

FIGS. 1 and 2 show the hatch 24 in the closed position, closing an aperture portion 20, which is visible in FIGS. 3 and 3, where the hatch 24 is in an open position.

Figure 5:
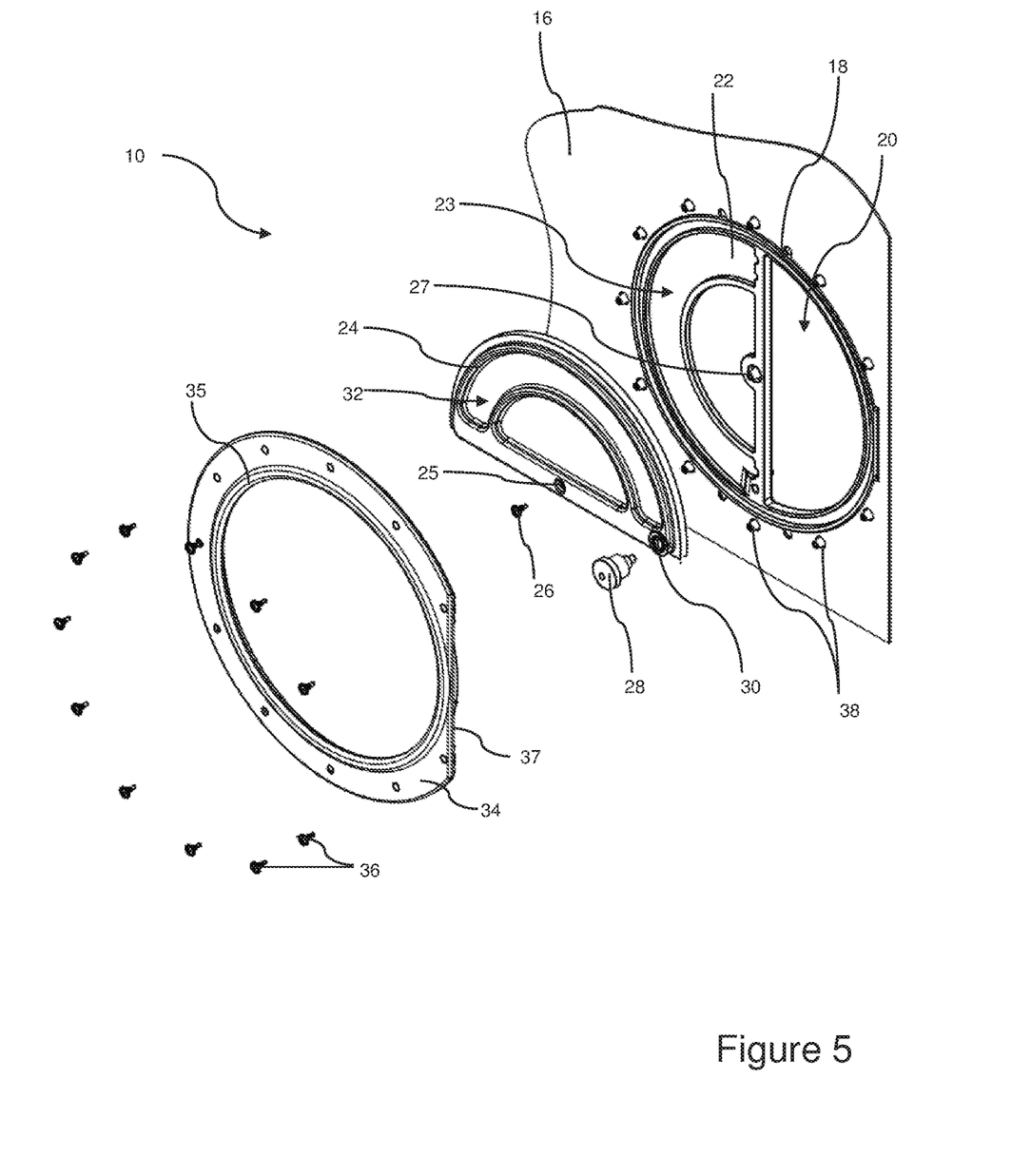
FIG. 5 is an exploded rear face view of a hatch assembly of the invention, partly mounted into part of a screen door.

FIG. 5 shows an exploded rear face view of a hatch assembly 10, indicating a manner of inclusion of the assembly 10 into a portion of a screen door 16. A rim 18 is fitted into a substantially round aperture 20 in the screen 16. The rim 18 can include a static member 22 or the static member 22 can be fitted to the rim 18 after fitting of the rim 18 to the screen 16. The rim 18 is fitted to the screen 16 from a front face of the screen. The static member 22 is substantially semi-circular and therefore covers substantially half of the aperture 20. The static member 22 includes on the rear face a channel 23 along the perimeter of the static member 22.

The hatch 24 is attached to the static member 22 by connection at a point in a central portion 25 of the perimeter line of the hatch 24 and a central portion 27 of the perimeter line of the static member 22. In the example shown, the static member 22 and the hatch 24 are connected with a screw 26, which passes through the aperture at a portion 25 of the hatch 24 and into the aperture at a portion 27 of the static member 22. The attachment of the hatch 24 to the static member 22 is such that the hatch 24 can slide over the static member 22 in a vertical plane in use.

The hatch 24 includes a protrusion 28 fitted to an end 30 of the perimeter line of the hatch 24. The protrusion 28 is configured to enable movement of the hatch 24 over the static member 22 in a vertical plane in use.

The hatch 24 includes on the rear face a channel 32 along the perimeter of the hatch 24. This channel 32 is narrower than the channel 23 of the static member 22. When the hatch 24 is attached to the static member 22, movement of the hatch 24 over the static member 22 is guided by movement of the channel 32 in the channel 23.

The rim 18 and static member 22 in this embodiment of the invention are shown as a unitary part. It will be understood that they may be provided as separate parts, for pre-assembly, or assembly in parts onto the door.

Similarly, the rim 18, the static member 22 and the hatch 24 may be manufactured as a unitary part. In this embodiment of the invention, the hatch 24 is shown as a separate part for pre-assembly, or assembly in parts onto the door.

In this example of the invention, a rim cover 34 is fitted over the hatch 24 from the rear face of the hatch assembly 10 and fixed to the rim 18 with screws 36, which fix into corresponding apertures 38 on the rim 18, thereby fixing the assembly 10 to the screen 16. The rim cover 34 is ring-shaped to correspond with the rim 18, the rim cover having a generally circular inner perimeter 35, and in this embodiment, the outer perimeter includes a linear portion 37. The linear portion 37 enables the hatch assembly 10 to be fitted into a screen door 40 such that the linear portion 37 abuts the frame 41 of the door 40.

Figure 6:
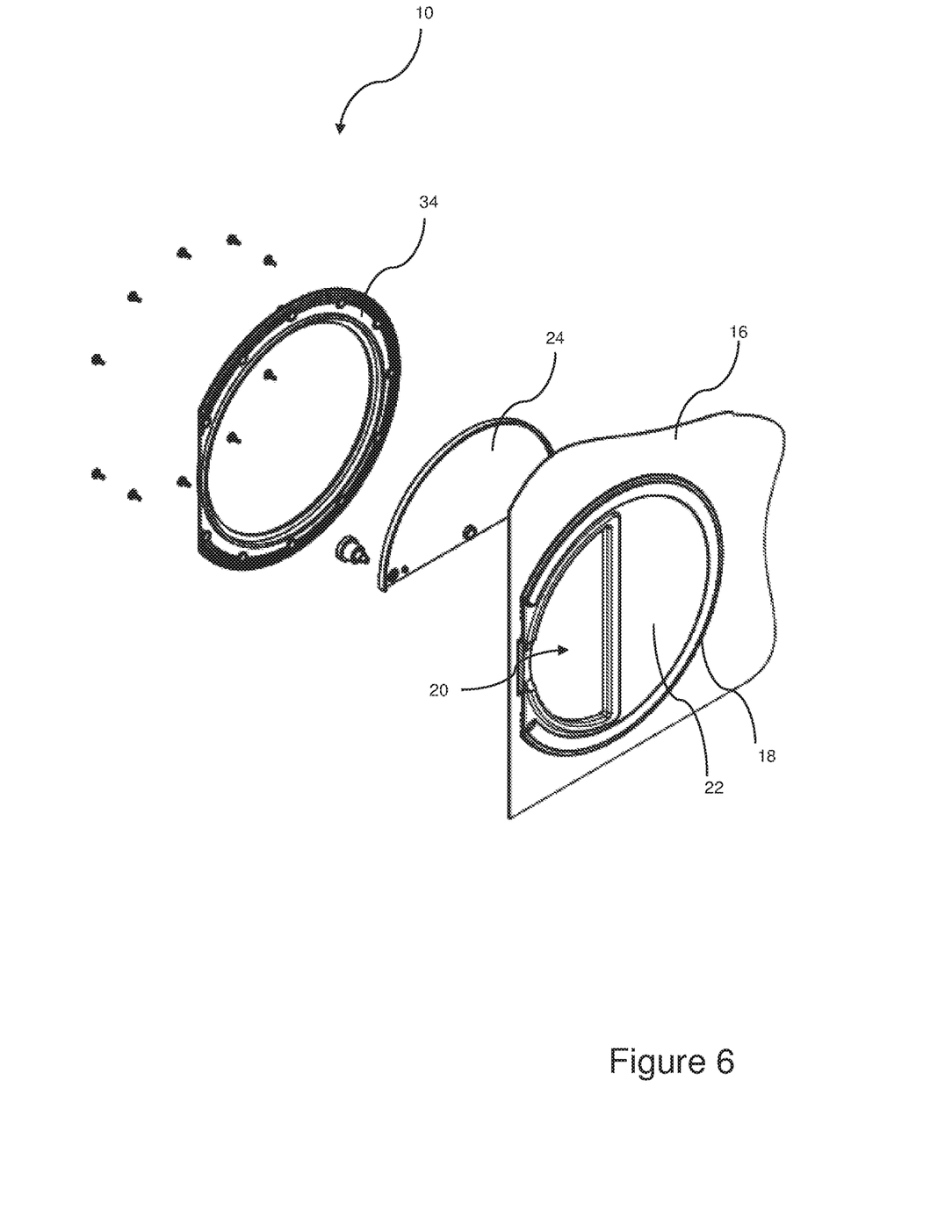
FIG. 6 is a front face view of the exploded view of the hatch assembly of FIG. 5.
Figure 7:
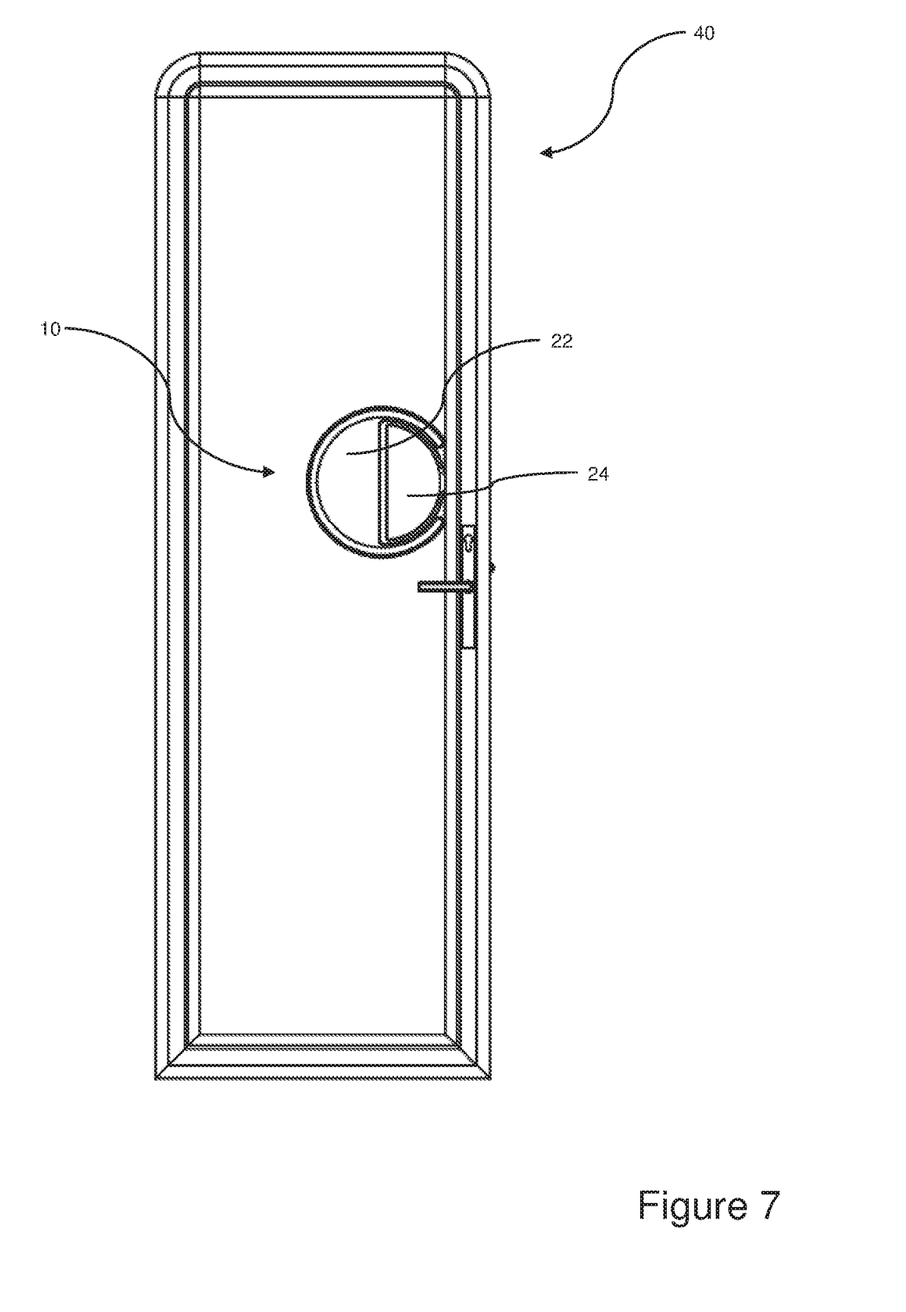
FIG. 7 is a front face view of a screen door including a door hatch assembly of the invention in a closed position.

FIG. 6 shows a front face view of the exploded view of the hatch assembly of FIG. 5, showing the rim 18 fitted onto a front face of the screen 16.

Referring also to FIGS. 7, 8, 9, and 10, a screen door 40 including a hatch assembly 10 of the invention is shown in use. Generally, a screen door of the invention is fitted or retrofitted inside a standard door of a camper vehicle or the like. The hatch assembly 10 of the invention enables easy access to the lock or handle of the standard door from inside the screen door 40 when the standard door is closed and/or locked and prevents access to the inside of the vehicle when the standard door is open and the screen door 40 is closed. When the hatch assembly 10 of the invention is in the closed position (FIGS. 7 and 8), the aperture 20 in the screen is covered by the hatch 24 and is therefore not visible in these figures.

Referring back to FIG. 1, when it is desired to open the hatch 24, the protrusion 28 is moved along the inside perimeter of the rim cover 34, thereby sliding the hatch 24 over the static member 22 and opening aperture 20 (see FIG. 3). From the inside of the vehicle to which the door of the invention is attached, a hand can now extend through the aperture 20 to engage with the handle or lock of the standard door of the vehicle, or with a front face handle on the screen door 40.

Reversing this process closes the hatch 24 over the aperture 20, and when closed, access from outside the vehicle to the projection 28 is prevented, thereby providing security inside the vehicle with the standard door open and the screen door 40 closed.

Figure 8:
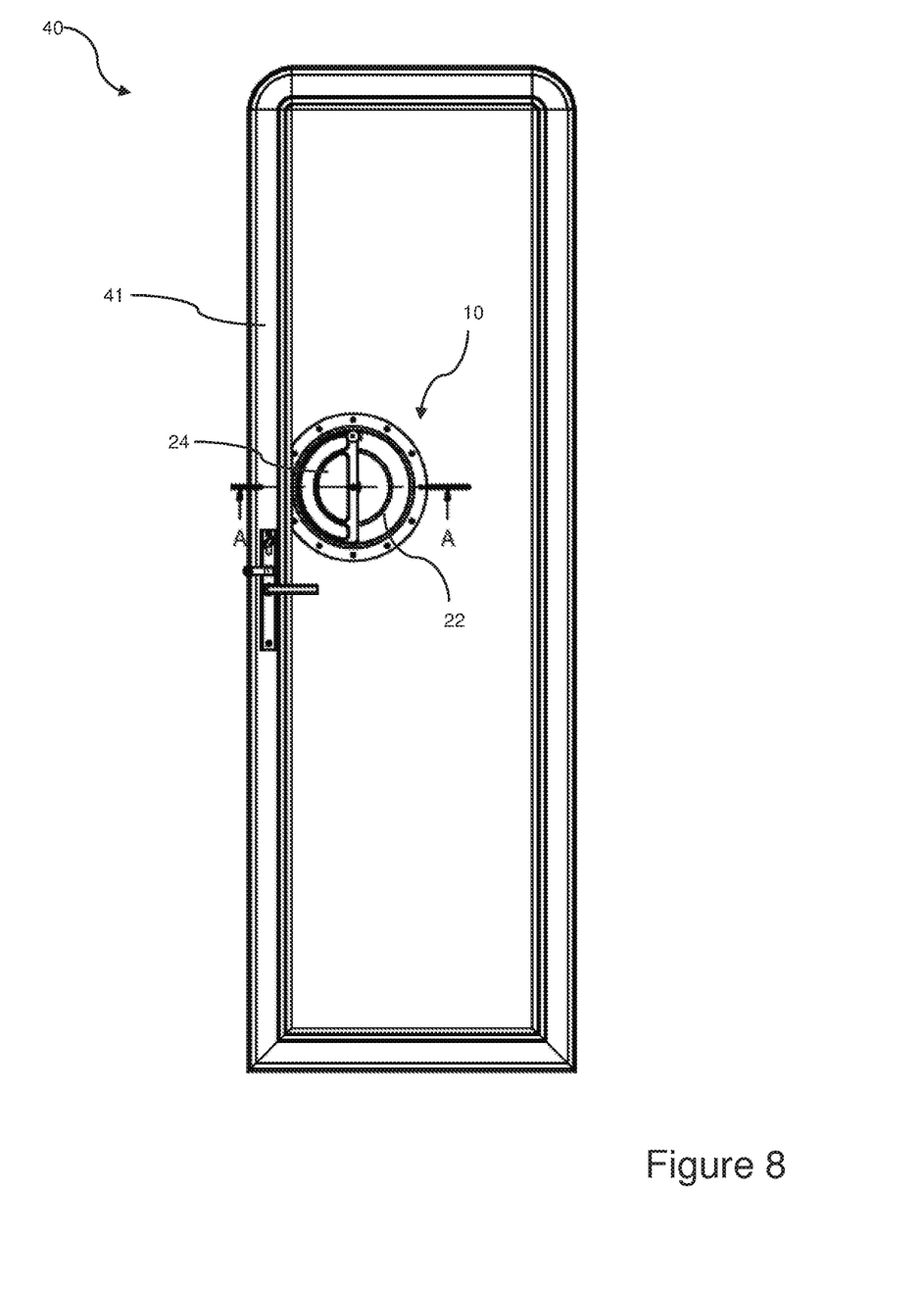
FIG. 8 is a rear face view of a screen door including a door hatch assembly of the invention in a closed position.
Figure 9:
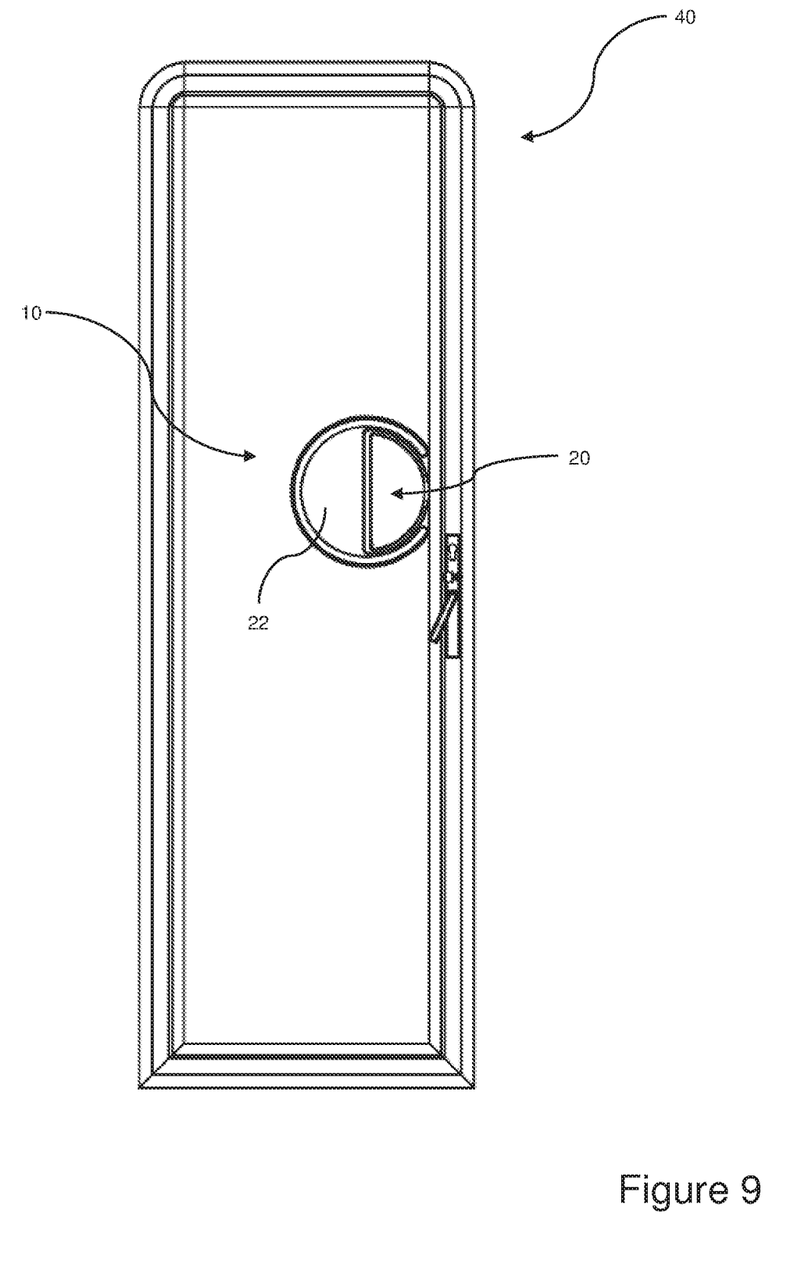
FIG. 9 is a front face view of a screen door including a door hatch assembly of the invention in an open position.
Figure 10:
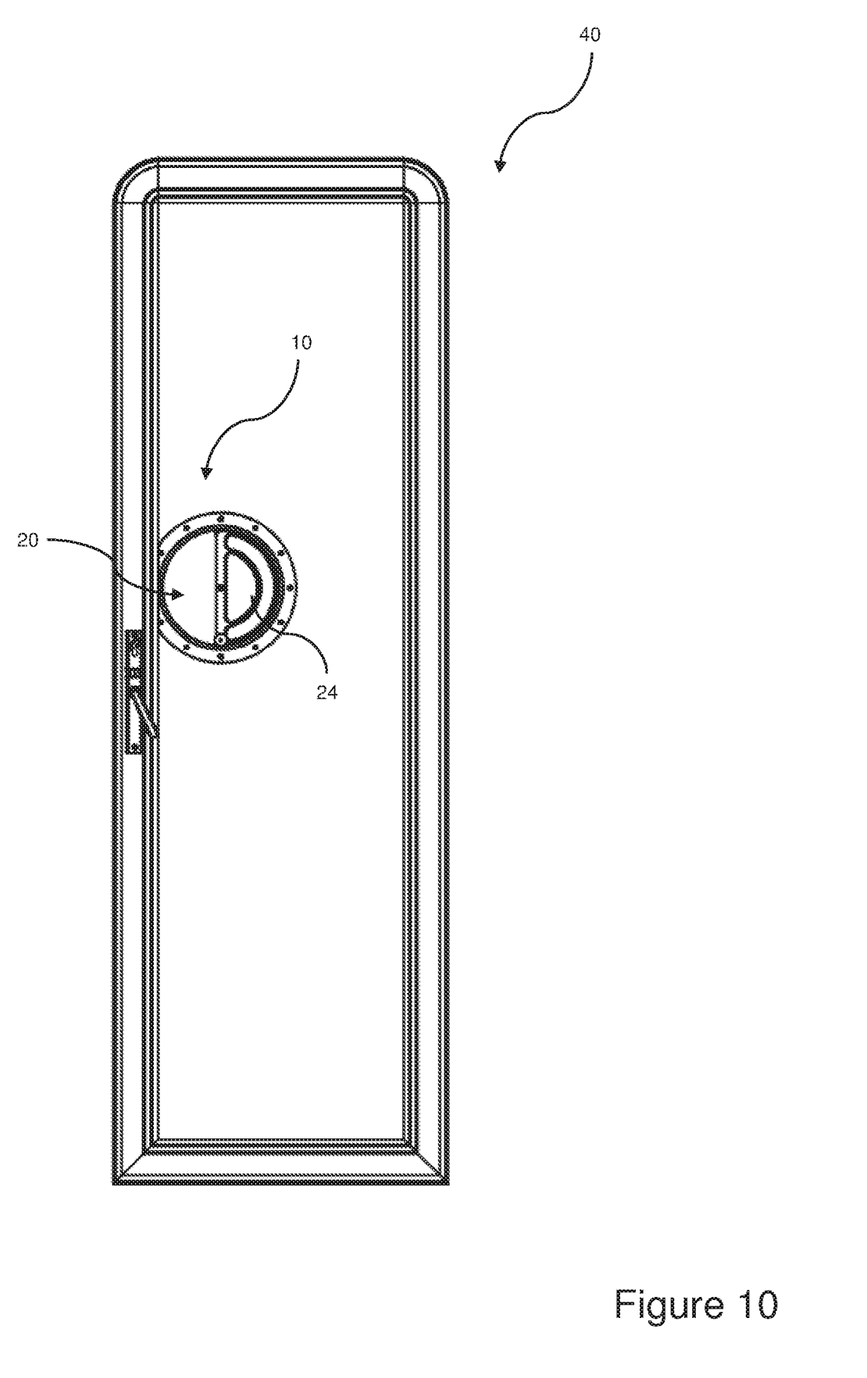
FIG. 10 is a rear face view of a screen door including a door hatch assembly of the invention in an open position.
Figure 11:
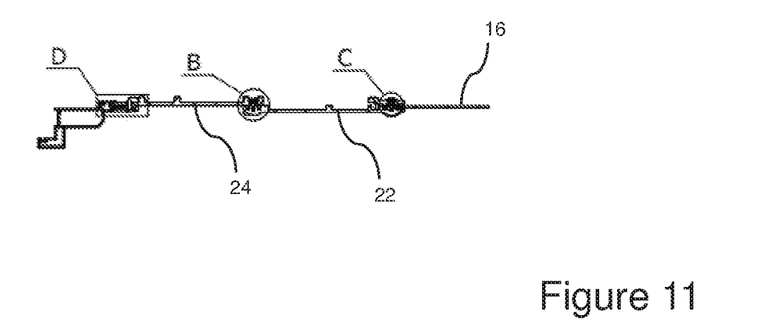
FIG. 11 is a cross-sectional view through plane A-A of FIG. 8.
Figure 12:
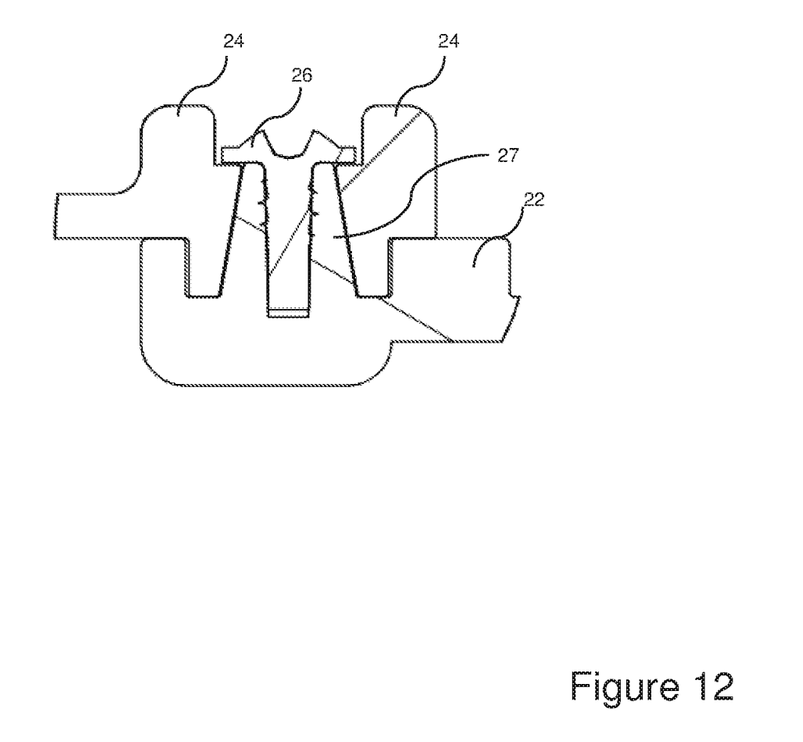
FIG. 12 is a detailed view of portion B of FIG. 11.

FIG. 11 is a cross-sectional view through plane A-A of FIG. 8. FIG. 12 is a detailed view of portion B of FIG. 11. This cross-section shows the attachment of the hatch 24 to the static member 22 by the screw 26, through a central portion of the hatch assembly 10, such that the hatch 24 can rotate around the screw 26, and slide over the static member 22. The screw 26 passes through the aperture at the portion 25 of the hatch 24 and into the aperture at the portion 27 of the static member 22.

Figure 13:
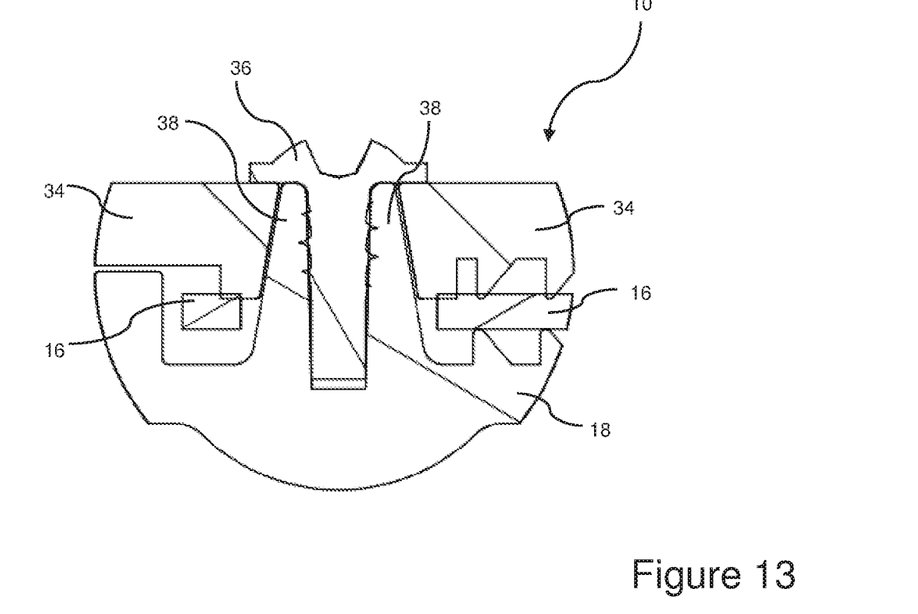
FIG. 13 is a detailed view of portion C of FIG. 11.

FIG. 13 is a detailed view of portion C of FIG. 11. This cross-section shows attachment of the rim cover 34 to the rim 23 by the screw 36, such that the screen 16 is held securely between the rim cover 34 and the rim 23. The screw 36 fixes into corresponding aperture 38 on the rim 18, thereby fixing the assembly 10 to the screen 16.

Figure 14:
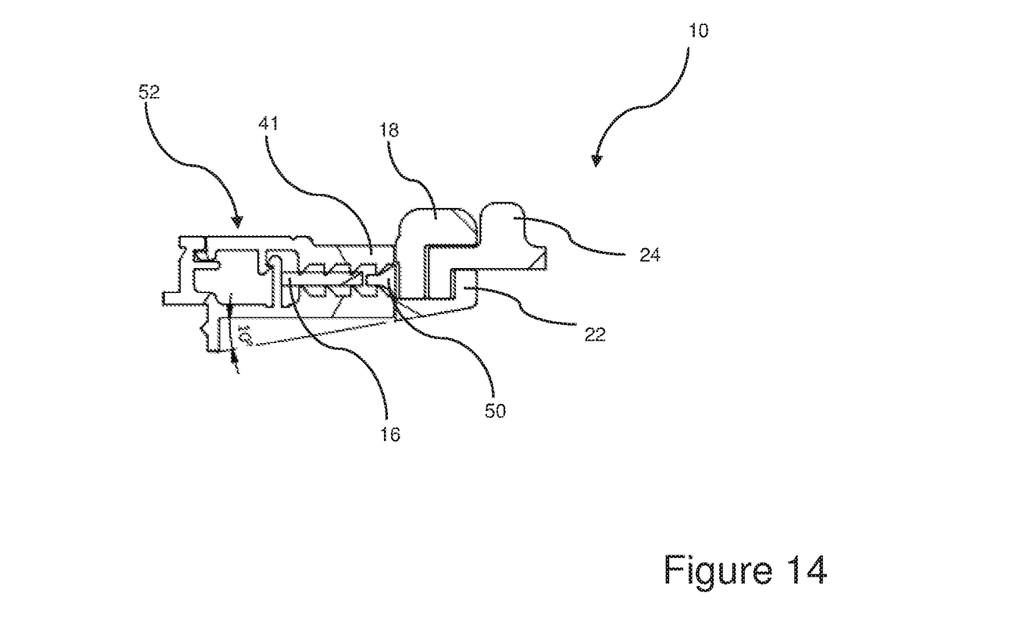
FIG. 14 is a detailed view of portion D of FIG. 11.

FIG. 14 is a detailed view of portion D of FIG. 11. This cross-section shows the positional fitting of the hatch assembly 10 abutting the frame 41 of the screen door 40 into which the hatch assembly 10 is fitted. The locator 50, which extends from the rim 18, assists with placement of the screen 16 for clamping to a screen door 40 with a conventional clamping assembly 52. The locator 50 is also secured by the clamping assembly 52, contributing to the fitting of the hatch assembly 10 to the screen door 40.

The hatch assembly 10 of the invention provides convenient and secure access from inside a screen door to which the assembly is fitted, to an outer door on a vehicle to which the screen door is fitted. The hatch assembly 10 can be retro-fitted to existing screen doors on vehicles, or can be included in a screen door to provide a screen door of the invention, which can be retrofitted to a vehicle.

The appended claims are to be considered as incorporated into the above description.

Throughout the specification, including the claims, where the context permits, the term "comprising" and variants thereof such as "comprise" or "comprises" are to be interpreted as including the stated integer or integers without necessarily excluding any other integers.

It is to be understood that the terminology employed above is for the purpose of description and should not be regarded as limiting. The described embodiments are intended to be illustrative of the invention, without limiting the scope thereof. The invention is capable of being practised with various modifications and additions as will readily occur to those skilled in the art.

When any number or range is described herein, unless clearly stated otherwise, that number or range is approximate. Recitation of ranges of values herein are intended to serve as a shorthand method of referring individually to each separate value falling within the range, unless otherwise indicated herein, and each separate value and each separate subrange defined by such separate values is incorporated into the specification as if it were individually recited herein.

Words indicating direction or orientation, such as "front", "rear", "back", etc, are used for convenience. The inventor(s) envisages that various embodiments can be used in a non-operative configuration, such as when presented for sale. Thus, such words are to be regarded as illustrative in nature, and not as restrictive.

The invention claimed is:

1. A screen door including a door hatch assembly for an aperture in the screen door, the door hatch assembly including:
   a substantially round rim mountable on a periphery of the aperture;
   a static member mounted in the rim and configured to cover at least a first portion of the aperture; and
   a hatch engaged with the static member and movable over the static member to reversibly cover at least a second portion of the aperture, wherein the static member and the hatch are substantially semi-circular.

2. The screen door as claimed in claim 1, further including a rim cover mountable on the rim from an inner face of the door.

3. The screen door as claimed in claim 1, further including means to move the hatch over the static member.

4. The screen door as claimed in claim 3, in which the means is attached to the hatch.

5. The screen door as claimed in claim 3, in which the means to move the hatch is a plunger pin attached to an end portion of a diameter line of the hatch.

6. The screen door as claimed in claim 1, in which the rim and static member are unitary.

7. The screen door as claimed in claim 1, in which the rim, static member and hatch are unitary.

8. The screen door as claimed in claim 1, in which the hatch is engaged with the static member by means of a screw passing through a midline of a diameter line of each of the hatch and static member such that the hatch pivots around the screw to reversibly cover the second portion of the aperture in the screen door.

* * * * *